Nov. 12, 1968   J. J. CERVENKA ET AL   3,409,972
MACHINE FOR APPLYING TERMINAL LUGS TO COIL FORMS AND THE LIKE
Filed June 8, 1966   7 Sheets-Sheet 1

INVENTORS
JOSEPH J. CERVENKA
MARVIN E. HETZEL
BY
Merzall, Johnston, Cook & Root
ATTORNEYS Nov. 12, 1968  J. J. CERVENKA ET AL  3,409,972
MACHINE FOR APPLYING TERMINAL LUGS TO COIL FORMS AND THE LIKE
Filed June 8, 1966  7 Sheets-Sheet 4
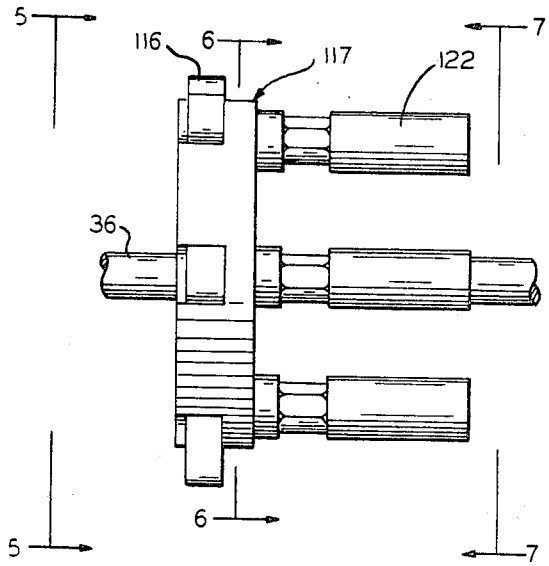
FIG.4
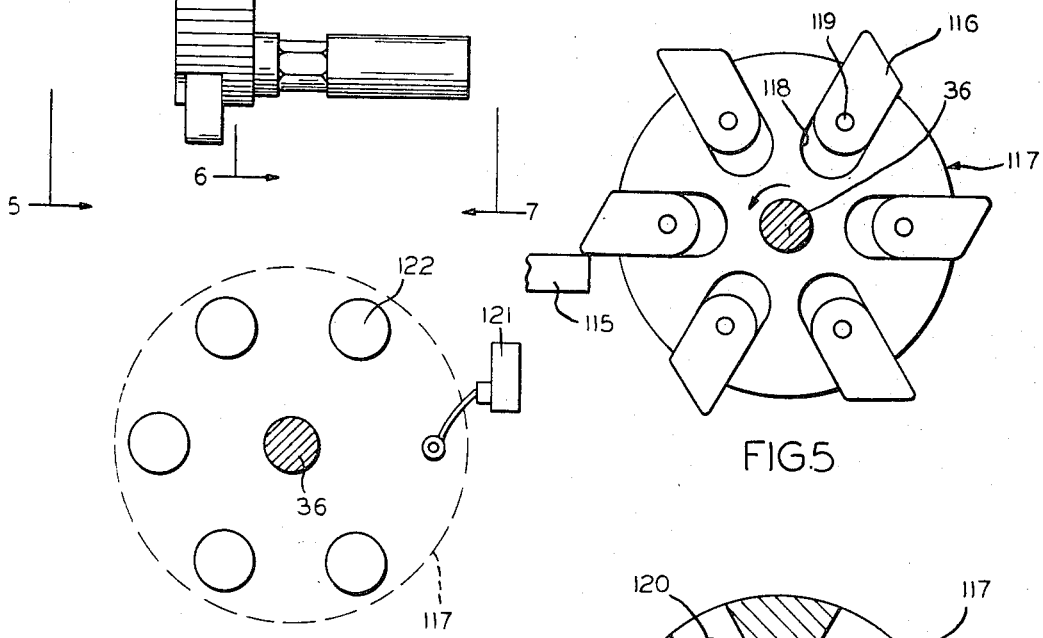
FIG.5
FIG.7
FIG.6
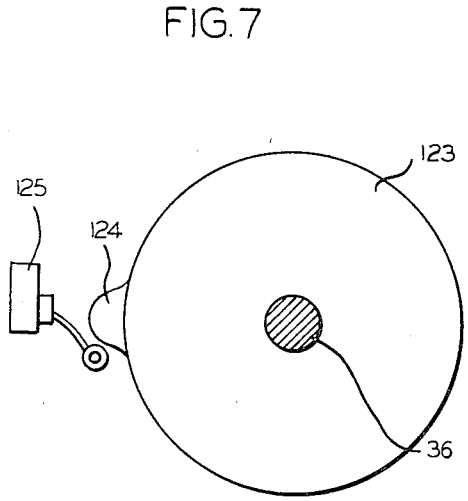
FIG.8
INVENTORS
JOSEPH J. CERVENKA
MARVIN E. HETZEL
BY
Marzall, Johnston, Cook & Root
ATTORNEYS

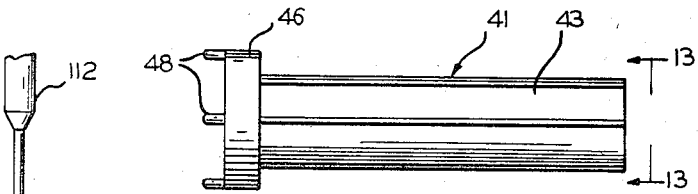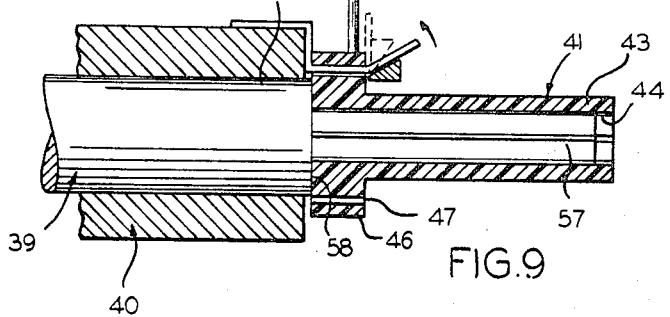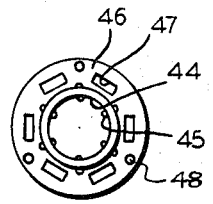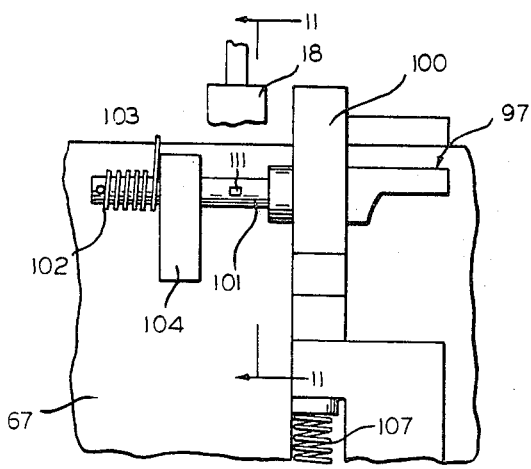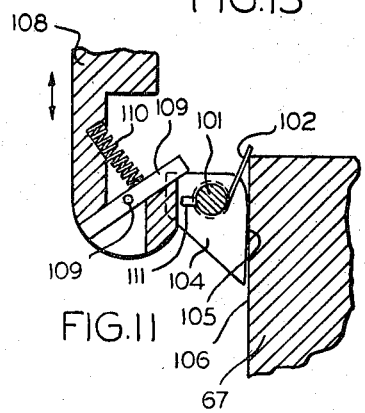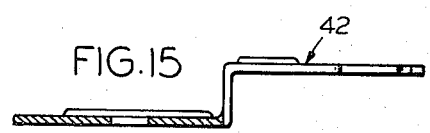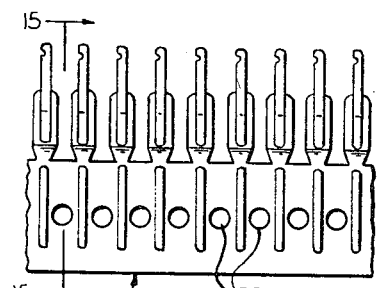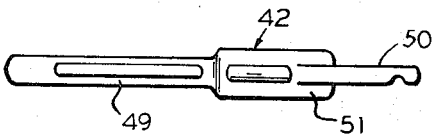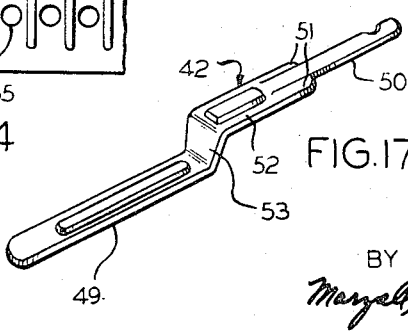

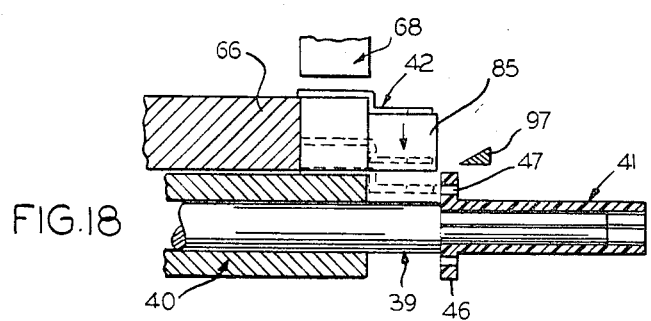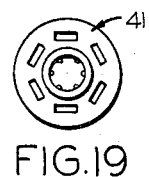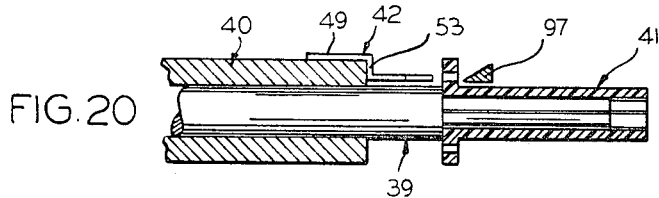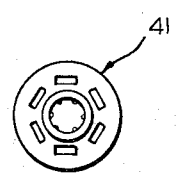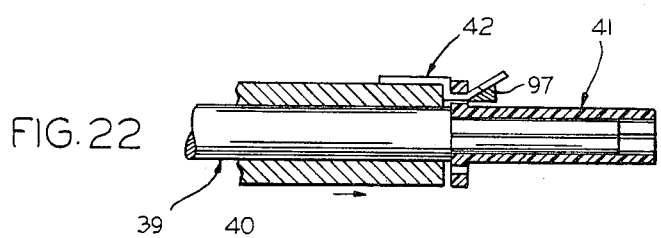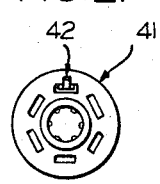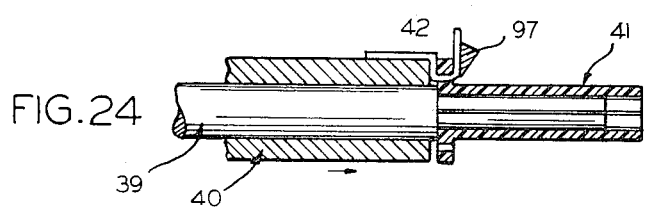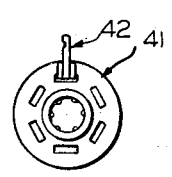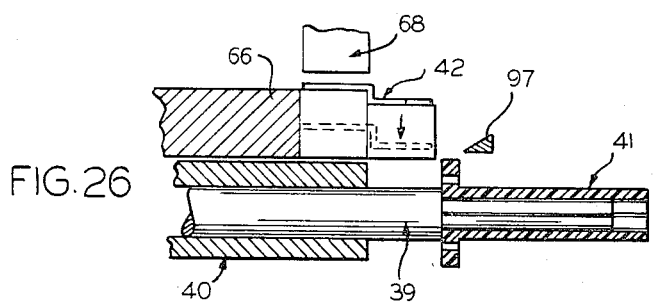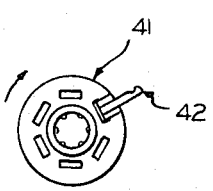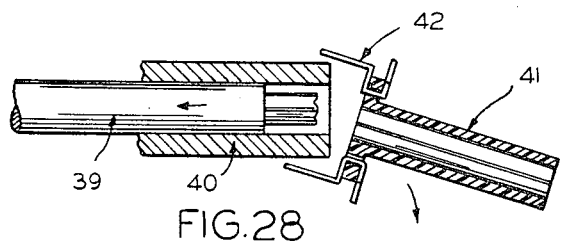

United States Patent Office 3,409,972
Patented Nov. 12, 1968

3,409,972
MACHINE FOR APPLYING TERMINAL LUGS TO COIL FORMS AND THE LIKE
Joseph J. Cervenka, 410 S. Kenilworth, Elmhurst, Ill. 60126, and Marvin E. Hetzel, 1825 S. 49th Ave., Cicero, Ill. 60650
Filed June 8, 1966, Ser. No. 556,038
12 Claims. (Cl. 29—203)

ABSTRACT OF THE DISCLOSURE

Machine for applying a plurality of terminal lugs to a coil form including detaching lugs singly from a chain form of lugs and applying same sequentially to a coil form and bending of the lugs to the coil form to secure same thereto.

---

This invention relates in general to a machine for applying lugs to tubular members, and more particularly to a machine for applying terminal lugs to coil forms and the like, and still more particularly to a machine for consecutively detaching or severing terminal lugs from a strip or chain form of terminal lugs and applying each detached lug to a coil form, although other uses and purposes may be apparent to one skilled in the art.

The machine of the present invention includes a rotatable mandrel shaft having a mandrel on one end thereof adapted to receive in oriented relation a tubular member such as a coil form, and to mount a plurality of terminal lugs on the coil form, wherein the terminal lugs are received by the machine in strip or chain form. The coil form with the terminal lug therein is further adapted to have one or more windings thereon, which windings are to be connected to the terminal lugs thereby defining a coil that constitutes an electronic component for use in electronic circuitry. The coil form illustrated herein is generally constructed of a suitable insulating material such as a plastic or the like, and will be referred to also as a tubular member. The terminal lugs are mounted and locked on the coil form, providing tying portions for connection thereto of coils and connecting blades for connection of the coil in circuitry with other components.

A chain or strip form of terminal lugs is fed to a position in alignment with the mandrel and an injector and ejector telescopically received over the mandrel, wherein a single terminal lug is severed or detached from the strip form and positioned on the injector and ejector member or bushing. Thereafter, the injector bushing is moved relative to the mandrel to inject or insert one end of the terminal lug through a lug receiving opening on the coil form and into the position desired. As the terminal lug is being inserted, a plow or ramp serves to initially bend a part of the terminal lug toward locking position, and thereafter the plow or ramp is further actuated to bend a portion of the terminal lug to a final position to lock the lug on the coil form. At the conclusion of the lug inserting and bending operation, the mandrel shaft and mandrel are rotatably indexed to a new position for a subsequent lug detaching, inserting and bending operation. The mandrel shaft and mandrel may be sequentially indexed for further lug mounting operations until the desired number of lugs have been mounted on the coil form. The injector and ejector bushing then operates as an ejector to eject the coil form with the lugs thereon from the mandrel so that the mandrel can thereafter receive another coil form.

Accordingly, it is an object of the present invention to provide a new and improved machine for applying lugs to tubular members, and especially for applying terminal lugs to coil forms.

Another object of this invention resides in the provision of a new and improved machine for sequentially detaching single lugs from a chain form of lugs and consecutively applying same to a coil form, and thereby applying a predetermined number of lugs to a coil form.

Still another object of this invention is in the provision of a new and improved machine that may be quickly and easily adjusted to apply a variable number of terminal lugs to coil forms quickly and easily, and especially wherein the lugs are supplied to the machine in chain or strip form.

Other objects, features and advantages of the invention will be apparent from the following detailed disclosure, taken in conjunction with the accompanying sheets of drawings, wherein like reference numerals refer to like parts, in which:

FIG. 4 is a greatly enlarged side elevational view of the indexing head and fingers mounted on the mandrel shaft;

FIG. 5 is a view of the indexing head taken substantially along line 5—5 of FIG. 4 and looking in the direction of the arrows;

FIG. 6 is a transverse sectional view taken through the indexing head and substantially along line 6—6 of FIG. 4;

FIG. 7 is a view of the indexing head and associated cycling switch taken substantially along line 7—7 of FIG. 4 and looking in the direction of the arrows;

FIG. 8 is an enlarged view of the ejector cam and associated ejector switch, taken substantially along line 8—8 of FIG. 1;

FIG. 9 is a generally axial sectional view, partially fragmentary, taken through the mandrel and injector-ejector bushing, and a coil form mounted on the mandrel, and illustrating the bending operation of the lug;

FIG. 10 is an enlarged front elevational view of that part of the machine serving to bend the lug after it has been inserted in a coil form, with other parts omitted for purposes of clarity;

FIG. 11 is a sectional view taken substantially along line 11—11 of FIG. 10 and illustrating the bending arm driving means;

FIG. 12 is an enlarged side elevational view of one form of coil form onto which terminal lugs may be mounted by the machine of the present invention;

FIG. 13 is an end elevational view of the coil form of FIG. 12 and taken substantially along line 13—13 thereof;

FIG. 14 is an enlarged top plan view of a portion of a strip form of terminal lugs to illustrate the present invention;

FIG. 15 is a sectional view taken through the strip form of terminal lugs of FIG. 14 and substantially along line 15—15 thereof;

FIG. 16 is a bottom plan view of a single terminal lug after it has been blanked from the strip form of terminal lugs;

FIG. 17 is a perspective view of the terminal lug of FIG. 16;

Figure 29:
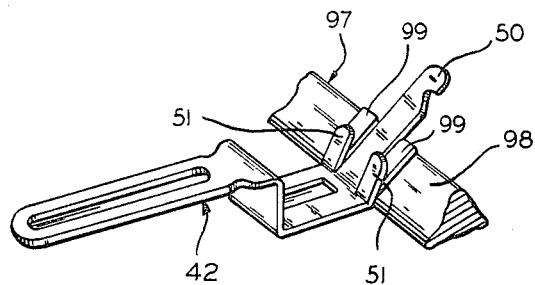
Figure 31:
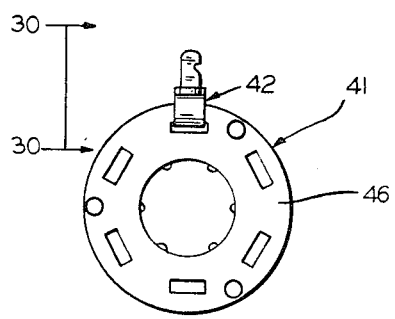
Figure 30:
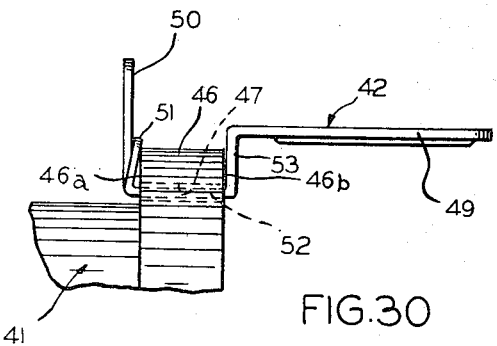
Figure 32:
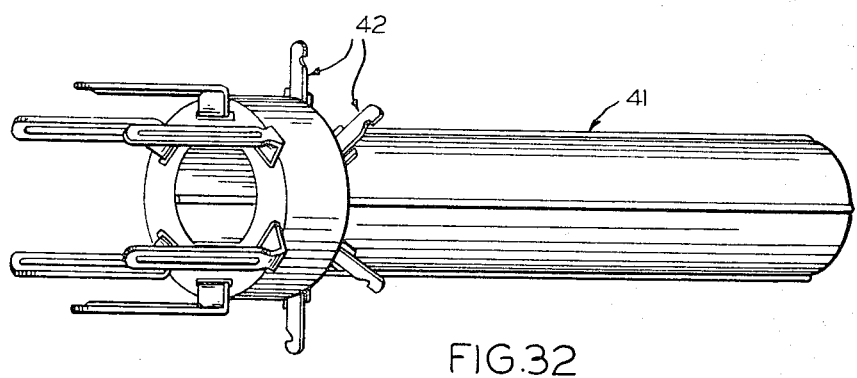

FIGS. 18, 20, 22, 24 and 26 are diagrammatic views of the mandrel with a coil form thereon and illustrating the steps of detaching or blanking a terminal lug from a strip form of terminal lugs, inserting a terminal lug into a lug receiving opening on a coil form, bending the tying portion and locking tabs or detents into locking position, and indexing of the mandrel and coil form for a subsequent lug mounting operation, while FIGS. 19, 21, 23, 25 and 27 are respectively end elevational views of the coil form corresponding to FIGS. 18, 20, 22, 24 and 26;

FIG. 28 is a diagrammatic view illustrating the ejection of a coil form with lugs mounted thereon from the mandrel at the completion of the lug mounting operations;

FIG. 29 is an enlarged perspective view of a lug and the bending arm illustrating the bending operation with the coil form removed for purposes of clarity;

FIG. 30 is a greatly enlarged fragmentary view of a coil form portion and a terminal lug mounted thereon and in locked relationship thereto;

FIG. 31 is an end view of the tying portion end of the lug as mounted on the coil form and taken substantially along line 31—31 of FIG. 30; and FIG. 32 is an enlarged perspective view of a coil form having lugs mounted thereon in all of the lug receiving openings thereof.

Referring now to the drawings, the illustrated embodiment of the present invention includes a base 35 rotatably supporting a horizontally extending mandrel shaft 36 in bearing blocks 37 and 38. At the forward end of the mandrel shaft 36, this end being at the front of the machine as viewed in FIG. 2, a mandrel 39 is suitably supported by the mandrel shaft 36 and an injector and ejector bushing 40 is slideably received thereover. See FIGS. 1–3 and 9.

The mandrel 39 is adapted to receive a tubular member such as a coil form 41, illustrated diagrammatically and as an actual sample in FIGS. 9, 12 and 13 for having mounted thereon a plurality of lugs such as the terminal lugs 42 illustrated in FIGS. 14–16. It should be appreciated that any type of tubular member or coil form may have lugs or terminal lugs mounted thereon by the present machine in that the machine can be readily adapted and adjusted for handling different coil forms and/or terminal lugs. For example, the mandrel 39, together with the injector and ejector bushing 40, may be of any desired form to accept any size coil form and mount other types of lugs than those illustrated in the drawings. For purposes of illustrating the invention, a more specific description of the coil form and lugs illustrated in the drawings will be made to properly set forth the present invention.

The coil form 41 includes an elongated tubular body 43 having an axial bore 44 extending therethrough and provided with a plurality of axially extending and circumferentially spaced, inwardly extending ribs 45. A radially extending flange 46 is provided at one end of the tubular body 43, and through which extend a plurality of axial lug receiving openings 47, in this instance, six in number. There also being six ribs 45, which are oriented relative to the lug receiving openings 47, such provides means for properly orienting each coil form on the mandrel 39. Further, there are three circumferentially spaced and axially extending pins 48 on the free end of the flange 46, which pins are equally spaced at the periphery of the flange. The lug receiving openings 47 and the inwardly extending ribs 45 are also equally spaced from each other, but it should be appreciaed that the lug applying machine of the present invention could well receive coil forms and the like where the lug receiving openings are not equally spaced from each other, and thereafter properly apply and mount lugs on the coil form. While the coil form may be made of any material, it is preferably made of a dielectric such as a suitable plastic.

The terminal lugs 42 illustrated herein are adapted to be mounted on the coil form 41 and include as in single form, a connecting blade 49, a tying portion 50 and locking detents or tabs 51. The locking detents 51 are formed on opposite sides of the tying portion 50, all of which extend from a body portion 52 that is interconnected with the blade portion by a connecting portion 53 extending at substantially right angle thereto. The body portion 52, together with the tying portion 50 and locking detents or tabs 51 are adapted to be inserted or injected into a lug receiving opening on the coil form until the connecting portion 53 abuts against the coil form flange 46, and thereafter the tying portion and locking detents are adapted to be bent to lock the lug to the coil form in a manner as best shown in FIG. 30. The terminal lugs 42 are blanked from a strip or chain form of lugs 54, FIG. 14, wherein it can be appreciated that the final step of formation of the terminal lug involves blanking or severing of the lug from strip form by blanking the connecting blade 49 from the chain form. A plurality of equally spaced feed and control holes 55, equally spaced from each other, are provided in the chain form of lugs 54 for feeding and controlling the orientation of the strip form of lugs during the blanking operation.

Figure 2:
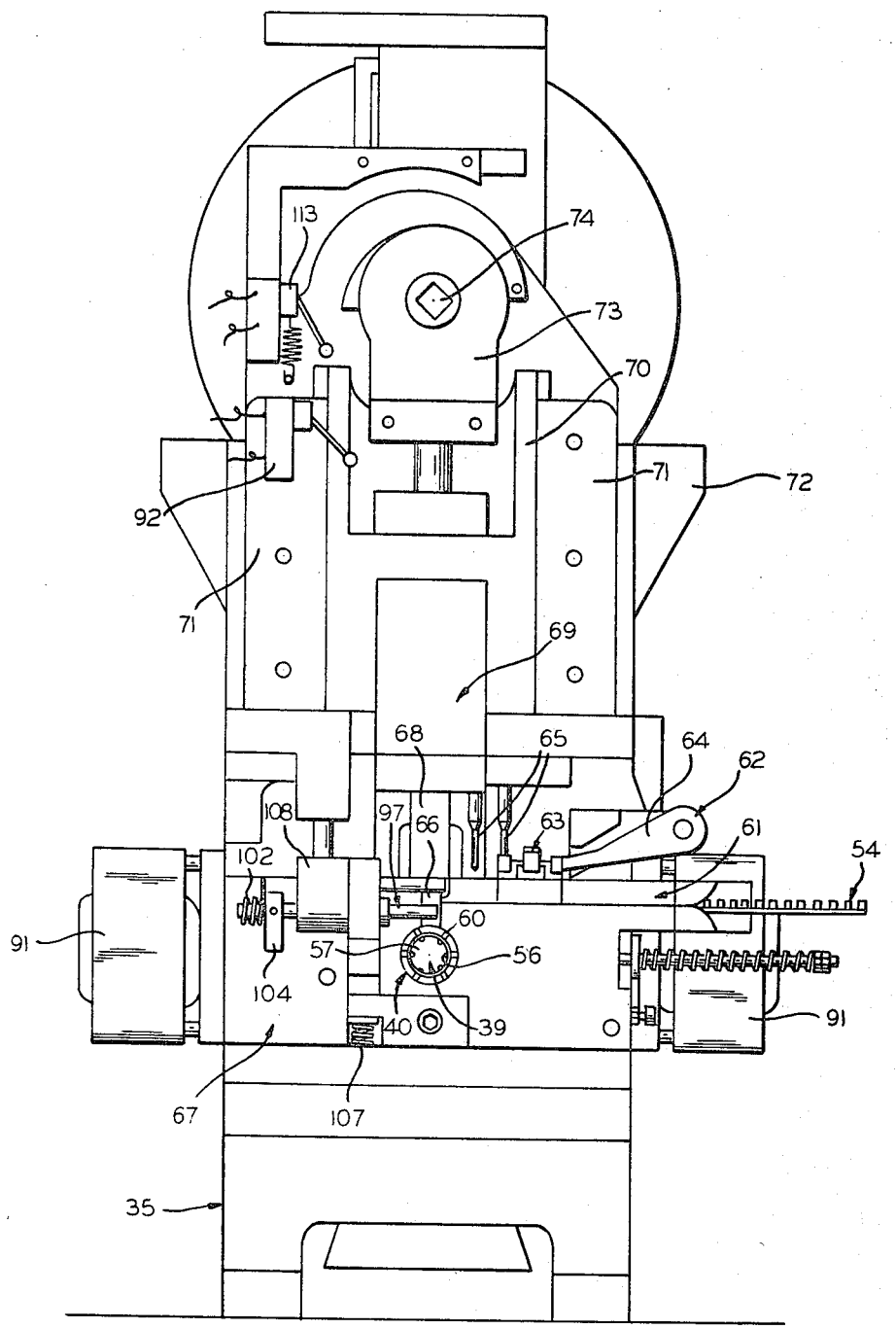
FIG. 2 is a somewhat enlarged front elevational view of the machine according to the present invention.

In order to properly position each coil form on the mandrel 39, a plurality of axially extending and circumferentially spaced grooves 56, FIGS. 2 and 9, are provided on the coil receiving portion 57 of the mandrel, which grooves are arranged to coact with the positioning ribs 45 on each coil form. Further, the coil receiving portion 57 of the mandrel is diametrically sized so that the coil form will fit snugly thereon although in such a manner that it can easily be slid on and off. When mounting a coil form on the mandrel 39, the coil form is slid onto the coil receiving portion 57 and to a position so that the flange 46 abuts against a shoulder 58 defined by the junction of the coil receiving portion 57 and an enlarged cylindrical bushing receiving portion 59 of the mandrel upon which is slideably mounted the injector and ejector bushing 40. Slots 60, FIG. 2, are provided in the end of the bushing 40 to freely receive the pins 48 when a coil form 41 has been mounted on the mandrel.

Figure 3:
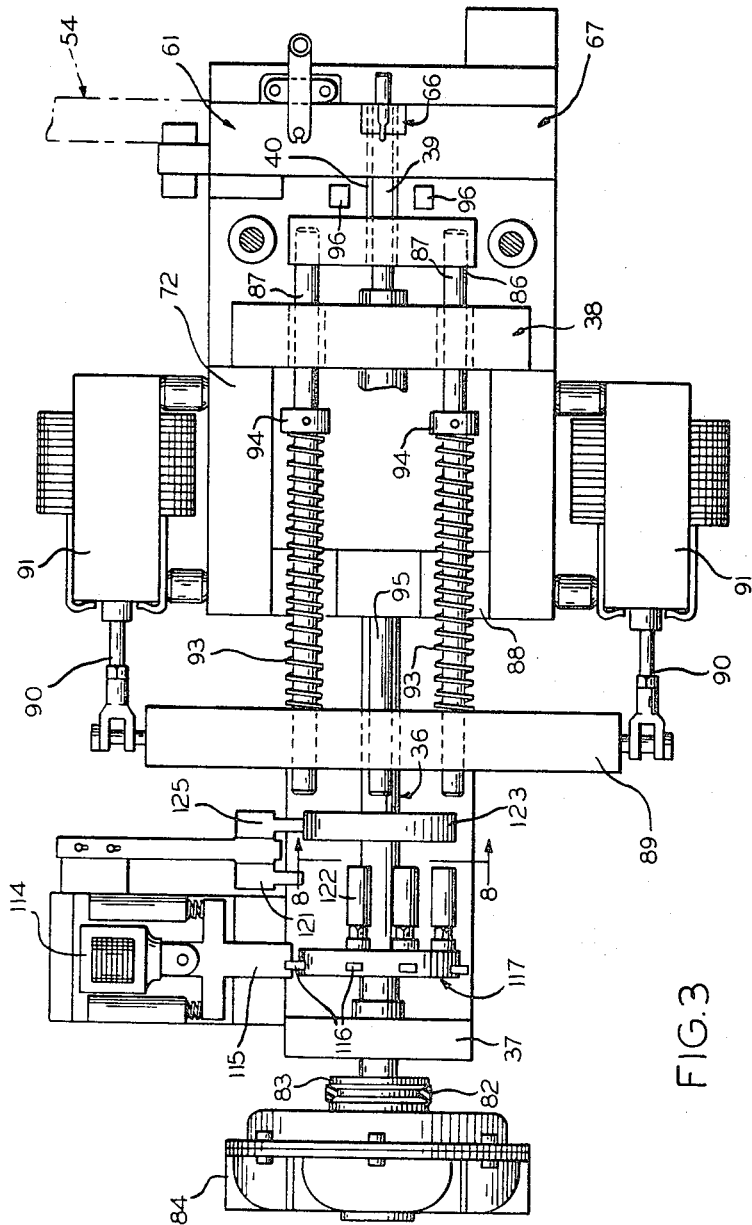
FIG. 3 is a view taken substantially along lines 3—3 of FIG. 1 showing some parts in section and other parts in full for purposes of clarity.

The chain or strip form of lugs 54 is suitably received from a spool upon which the chain form may be coiled, and directed into a track 61, FIGS. 2 and 3, and advanced step-by-step along the track 61 by a feed mechanism 62. The feed mechanism may be of any suitable type and therefore will not be described in great detail, except that it is driven by the machine during the blanking operation. Further, it includes the usual type of anti-back slide unit 63 that prevents retraction of the strip form when the feed finger 64 of the feeding mechanism retracts to engage the next feed hole 55. Also, control pilot pins 65 are provided to hold the strip form 54 in positive registry and thereby properly orient a lug in the blanking position during the blanking operation.

Each terminal lug is blanked from the chain form of terminal lugs 54 at the blank forming position which is directly above and in alignment with the mandrel 39, wherein a die 66, FIGS. 2, 3 and 18, is provided and supported on a die holder 67 of a die set and which is supported on the base 35. Coacting with the die 66 is a punch 68 that is supported on a punch holder 69. The punch holder 69 is supported on a slide block 70 arranged for vertical sliding movement in guides 71 carried on the frame 72 of a punch press. A crank 73 is connected to and extends upwardly from the slide block 70, and is carried on a crank arm 74 of a crankshaft 75 that is suitably rotatably supported on the frame of the punch press. The crankshaft 75 extends horizontally and in alignment superposed above the mandrel shaft 37. Normally, a flywheel 76 rotates freely on the crankshaft 75 and is driven continually by a motor 77 through a suitable belt 78. A clutch 79 is provided for locking the flywheel 76 to the crankshaft 75 and is actuated by a press release solenoid 80.

At the rear end of the crankshaft 75, a pulley 81 is mounted for corotation therewith, and has a belt 82 trained thereover and over a pulley 83 freely rotatable on the mandrel shaft 36 but in driving engagement with a fluid or friction clutch 84 to drive the mandrel shaft 36.

It should be appreciated that power is supplied to the clutch 84 only when the flywheel 76 is locked to the crankshaft 75 for rotating same. The machine in initially cycled by pressing a start button that fires a capacitor to energize the press release solenoid 80 to cause one revolution of the crankshaft which drives the punch holder 69 and punch 68 through a downward stroke and an upward or return stroke. In general, the machine is of the punch press type like that disclosed in our copending application Ser. No. 346,791, filed Feb. 24, 1964, now Patent No. 3,266,695, granted Aug. 16, 1966.

On the downward stroke of the punch 68, a terminal lug is blanked from the chain form of terminal lugs which is positioned so that a terminal lug is properly aligned with the die 66. Prior to the blanking or severing operation, the pilot pins 65 engage in feed holes of the chain form of terminal lugs to hold the chain form of lugs in proper position for the blanking operation. The terminal lug die 66 also includes a guide 85 through which the punch 68 drives the blanked lug and into the lug injecting position on the mandrel as shown in FIG. 20. The injector and ejector bushing 40 is retracted to receive the lug, whereby the connecting blade portion 49 lays on the bushing 40 and the connecting portion 53 abuts against the outer end of the bushing as seen in FIG. 18. It should also be noted in FIG. 18 that a lug receiving opening 47 is in lug receiving position, and therefore in alignment with the lug injecting position so that the tying portion end 50 of a lug will slide into a lug opening upon advancement of the injector and ejector bushing 40 to the position shown in FIG. 22. Referring particularly to FIG. 3, the bushing 40 is supported by a bushing holder 86 that is carried at the forward ends of a pair of parallel spaced slide rods 87 slidably supported in the bearing block 38 and a bearing block 88. The slide rods 87 are driven forward by a transversely extending drive bar 89 that is connected at each end to plungers 90 of solenoids 91. The solenoids 91 are mounted on opposite sides of the frame 72, and are energized by the closing of switch 92. The switch 92 is closed by the crank or eccentric 73 upon upward movement thereof, and subsequent to the time when the terminal lug has been advanced to lug injecting position. Driving force is transmitted from the drive bar 89 to the slide rods 87 resiliently through coil springs 93 received on the rods, bottoming at one end on the drive bar and at the other end on collars 94 fixed to the rods. Thus, the drive bar 89 freely receives the rods 87, and is also slideably guided by a guide bar 95 supported on the frame 72. During the injector stroke of the bushing 40, movement of the bushing along the mandrel is limited by stop bars 96, FIG. 3, that move into the path of the bushing holder 86. The stop bars 96 are mounted on the punch holder 69 and therefore move into and out of the path of the bushing holder 86 during the downward and upward strokes of the punch holder. Thus, during the blanking operation, the stop bars 96 move into the path of the bushing holder 86 and limit the movement of the bushing 40 to define the injector stroke thereof for injecting lugs into lug openings on the coil form. The bushing 40 also functions as a coil form ejector for ejecting a coil form from the mandrel as will be explained more clearly hereinafter.

Referring now to FIGS. 20–23, the lug injecting stroke of the bushing 40 is illustrated, wherein the tying portion and locking detent portions of the lug are injected into a lug receiving opening 47 arranged at the lug receiving position which is in alignment with the lug injecting position. During the injecting stroke of the bushing 40, the free ends of the tying portion and lock detent portions of the lug engage and are plowed upward or bent upward by a bending arm 97. Thereafter, as illustrated in FIGS. 24 and 25, upon further upward movement of the punch holder 69, the bending arm 97 is actuated to further bend the tying portion and locking detent portions of the lug into the position shown in FIGS. 24, 25, 30 and 31. With the completion of the bending operation by the bending arm 97, the terminal lug 42 is then properly locked onto the coil form 41.

As seen in FIGS. 29–31, the bending arm 97 is formed to bend the tying portion 50 of the lug through substantially a 90° arc until it extends substantially at right angles to the body portion 52 that resides within a lug receiving opening 47, while the locking detents or tabs 51 are bent through an arc greater than 90° so that they engage the face 46a of the flange 46. It is also noted in FIG. 30 that the connecting portion 53 engages the face 46b of the flange 46. In order to accomplish the differential in bending between the tying portion 50 and the locking detents 51, the bending arm 97 is provided with a lug engaging face 98 having spaced, raised bumps 99 that engage the locking detents 51 and define therebetween a groove into which is received the tying portion 50. The bending arm 97 is rotated to the position necessary to accomplish the bending as shown in FIGS. 30 and 31.

Referring now to FIGS. 2, 10 and 11, the bending arm 97 is shown as being rotatably mounted along the horizontal axis on a support 100 that is mounted on the die holder 67 for vertical slideable movement relative thereto, which movement is regulated by the downward and upward strokes of the punch holder 69. The bending arm 97 extends from a shaft 101 having a spring 102 thereon continually urging the bending arm to the position shown in FIGS. 18, 20 and 22, wherein the bending arm face extends at about a 45° angle with respect to the horizontal. The spring 102 is secured at one end to the shaft 101 and is provided with a leg 103 at the other end that bears against the forward vertical surface of the punch holder 67. As seen particularly in FIG. 11, the shaft 101 is continually urged counterclockwise by the spring 102, and a stop block 104 is fixed to the shaft 101, and provided with a face 105 that limits counterclockwise movement of the shaft 101 when it engages the vertical face 106 of the die holder 67 as seen in FIG. 11. As already mentioned, the support 100 for the bending arm 97 moves vertically in response to movement of the punch holder, and is normally urged to the upper position as shown in FIG. 18 by a spring 107. While in the upper position, a coil form 41 may be mounted on the mandrel 39 or ejected therefrom since the bending arm does not interfere with the path of movement of the coil form flange 46.

In order to cause rotation of the shaft 101 and the bending arm 97 to complete the bending operation as illustrated in FIG. 24, a shaft rotator 108, FIGS. 10 and 11, is provided and which is supported on the punch holder 69 and therefore movable upwardly and downwardly therewith. The shaft rotator 108 includes a pawl 109 resiliently biased by a spring 110 to the position shown in FIG. 13. The outer end of the pawl 109, on the upward stroke of the shaft rotator 108, engages a pin 111 projecting from the shaft 101, and thereby drives the pin upwardly to rotate the shaft. It can readily be appreciated that downward movement of the shaft rotator 108 has no effect on the shaft 101 inasmuch as the pawl 109 will be allowed to rotate about its pivot 109a against the force of the spring 110 when it engages the pin 111.

During the initial lug injecting stroke of the bushing 40 and the initial bending of the tying portion 50 and locking tab portions 51, the coil form is held in place on the mandrel 39 by a holddown bar 112, FIG. 9, which moves down against the flange 46 of the coil form and is not engaged with the coil form flange until completion of the lug injecting operation. The holddown 112 is supported from the punch holder 69.

Figure 1:
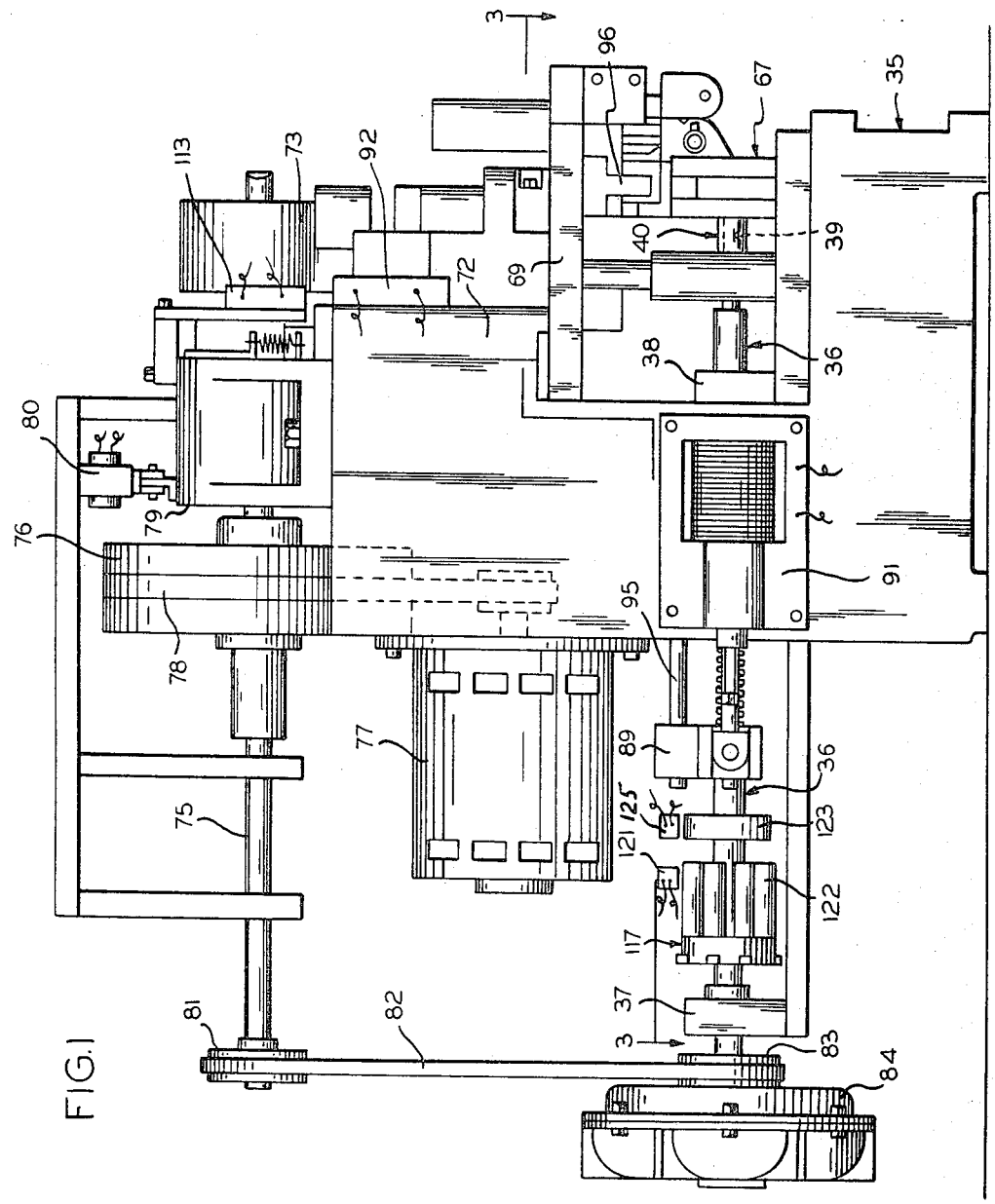
FIG. 1 is a side elevational view of the machine according to the present invention.

When the punch holder 69 is almost at the upper point of the return or upward stroke thereof, and subsequent to completion of the bending operation of the tying portion and locking detents, the crank or eccentric head 73 actuates a switch 113, FIGS. 1 and 2, that energizes an indexing solenoid 114, FIG. 3, to withdraw an indexing bar or stop 115 from the path of movement of a dog 116 carried on the indexing head 117. As seen in FIGS. 1, and 3-6, the indexing head 117 is mounted on the mandrel shaft 36 for corotation therewith, and includes six dogs 116 protruding from the outer periphery of the indexing head 117 and being circumferentially, equally spaced thereon. Further, it is seen that each dog 116 is carried in a radially extending slot 118 formed on the indexing head, and secured in position by a bolt 119, that by virtue of extending through a slot 120 enables fixing of the dog in position to be engaged by the indexing bar or stop 115 as seen in FIG. 5, or in position to make engagement with the indexing bar or stop. Further, it should be appreciated that the indexing head may be provided with a greater or lesser number of dogs and accompanying slots depending upon the number of stop positions desired of the mandrel during a lug applying application. By virtue of a rotating driving force being applied to the mandrel shaft 36 through the clutch 84 during operation of the crankshaft 75, withdrawal of the indexing bar 115 permits rotation of the mandrel shaft 36. It can be appreciated that the withdrawal of the bar is only momentary to allow indexing of the mandrel shaft until the next dog 116 is in position to engage the indexing bar to again stop the mandrel shaft in a position to align the next lug receiving opening with the lug injecting position for a subsequent mounting of a lug on the coil form.

As the indexing head 117 moves to the next indexed position, a switch 121 is actuated by a switch actuating rod 122 carried on the indexing head, which actuation fires the capacitor to energize the press release solenoid 80 and cause another cycle of the machine which includes blanking of a terminal lug from the chain form of lugs and positioning the blanked lug into lug injecting position, injecting the blanked lug into a lug receiving opening of the coil form, bending of the tying portion and locking detents of the lug to lock the lug on the coil form, and indexing of the mandrel to bring the next lug receiving opening of the coil form into lug receiving position to receive a lug. This cycle is repeated as long as a switch actuating rod or finger 122 actuates the switch 121 in the next indexed position. After all of the predetermined number of lugs have been mounted on the coil form, the indexing head 117 moves into home position as shown in FIG. 7, which position is void of a switch actuating finger 122 so that no further cycling of the machine will be made. It should be appreciated that at the completion of a cycle of the machine, the punch holder is in the up position, thereby removing the stop bars 96 from the path of the bushing holder 86. The switch engaging fingers 22 may easily be removed from the indexing head in coaction with the dogs 116 to easily adjust the machine for varying indexing operations to handle varying lug insertion operations.

At the conclusion of the lug inserting operations, means is provided for ejecting the coil form having the predetermined number of lugs thereon from the mandrel 39 which includes a disc 123 having a cam 124 on its periphery for actuating an ejector switch 125, FIGS. 1, 3 and 8. The ejector disc 123 is fixed on the mandrel shaft 36 for corotation therewith and adjusted to actuate the ejector switch 125 at the completion of the lug mounting operations and when the punch holder is in the upper position. The actuation of switch 125 energizes the solenoids 91 to drive the bushing 40 along the mandrel 39, and inasmuch as the stop bars 96 do not extend in the path of the bushing holder 86, the stroke of the bushing will be longer and will eject the coil form from the mandrel as shown in FIG. 28. Thereafter, another coil form may be mounted on the mandrel shaft 39, and operation of the start button will initiate another cycle of operation of the machine to mount the predetermined number of lugs on the coil form.

It will be understood that modifications and variations may be effected without departing from the scope of the novel concepts of the present invention, but it is understood that this application is to be limited only by the scope of the appended claims.

The invention is hereby claimed as follows:

1. A machine for successively mounting a plurality of lugs on a tubular member having a plurality of lug receiving holes comprising, a mandrel for receiving the tubular member, a rotatably mounted mandrel shaft for supporting said mandrel, means for feeding a chain form of lugs to a position in alignment with said mandrel, means for successively severing lugs one at a time from said chain form and advancing same to a lug injecting position, means for successively mounting a predetermined number of said severed lugs one at a time on said tubular member including means slidably mounted on said mandrel receiving a lug in said lug injecting position and injecting one end thereof into a lug receiving hole of said tubular member at a lug receiving position that is aligned with the lug injecting position and means for bending a portion of each injected lug to lock same on said tubular member, and means for indexing said mandrel shaft and mandrel following each lug mounting operation to successively move another lug receiving hole of said tubular member into said lug receiving position for receiving a lug and for automatically cycling said machine until a predetermined number of lugs have been mounted on said tubular member.

2. The combination as defined in claim 1, and means for ejecting the tubular member from said mandrel after the predetermined number of lugs have been mounted theron.

3. The combination as defined in claim 1, wherein means is provided on the mandrel coacting with means on each tubular member for orienting each tubular member on the mandrel so that the lug receiving openings will align with the lug receiving position and the tubular member will corotate with the mandrel during indexing thereof.

4. The combination as defined in claim 1, wherein said means for feeding said chain form of lugs and said means for mounting said lugs on the tubular member and said means for indexing the mandrel shaft and mandrel are operated in timed relation to and in response to said lug severing means.

5. A machine for successively mounting a plurality of terminal lugs on a coil form having a plurality of lug receiving holes comprising, a crankshaft having a crank in coupled engagement with a vertically slideably mounted slide block, means for driving and cycling said crankshaft through one revolution for driving said slide block through a downward stroke and a return upward stroke, a die set including a punch holder supporting a punch thereon and a die holder supporting a die thereon, means for connecting said punch holder to said slide block for driving said punch holder through downward and upward strokes, a mandrel for receiving a coil form in alignment with and below said die, a rotatably mounted mandrel shaft for supporting said mandrel, means on said die holder for supporting a chain form of terminal lugs, means driven by said punch holder for feeding the chain form so that a lug thereon is successively positioned in alignment with said punch and die, a lug injector bushing slideably mounted on said mandrel between a lug receiving position and a lug injected position, said punch adapted to coact with said die and sever a lug from said chain form and deposit same on said bushing in said lug receiving position, means for driving said bushing to said lug injected position and one end of each lug into a lug receiving hole during the upward stroke of the punch holder, means for bending a portion of each injected lug at said lug receiving position during insertion thereof and the upward stroke of said punch holder to lock the lug on the coil form, means for drivingly connecting said crankshaft and mandrel shaft, and means for indexing said mandrel shaft and mandrel following each lug mounting operation to successively move another lug receiving hole of said tubular member into said lug receiving position for receiving a lug and for automatically cycling said machine until a predetermined number of lugs have been mounted on said tubular member.

6. A machine for successively mounting a plurality of terminal lugs on a coil form having a plurality of lug receiving holes comprising, a crankshaft having a crank in coupled engagement with a vertically slideably mounted slide block, means for driving and cycling said crankshaft through one revolution for driving said slide block through a downward stroke and a return upward stroke, a die set including a punch holder supporting a punch thereon and a die holder supporting a die thereon, means for connecting said punch holder to said slide block for driving said punch holder through downward and upward strokes, a mandrel for receiving a coil form in alignment with and below said die, a rotatably mounted mandrel shaft for supporting said mandrel, means on said die holder for supporting a chain form of terminal lugs, means driven by said punch holder for feeding the chain form so that a lug thereon is successively positioned in alignment with said punch and die, said punch adapted to sever a lug from said chain form and deposit same in a lug injecting position, means on said mandrel receiving each lug in lug injecting position and injecting one end thereof into a lug receiving hole of said tubular member at a lug receiving position during the return stroke of the punch holder, means bending the injected end of each lug to lock same to the coil form during the upward stroke of the punch holder, means for drivingly connecting said crankshaft and mandrel shaft, and means for indexing said mandrel shaft and mandrel following each lug mounting operation to successively move another lug receiving hole of said tubular member into said lug receiving position for receiving a lug and for automatically cycling said machine until a predetermined number of lugs have been mounted on said tubular member.

7. The combination as defined in claim 6, wherein said indexing means includes an indexing head on said mandrel shaft having dogs thereon coacting with a movable stop bar operable in response to the upward stroke of said punch holder and means causing operation of said crankshaft driving and cycling means.

8. The combination as defined in claim 7, wherein said drivingly connecting means includes a clutch having impositive driving elements.

9. The combination as defined in claim 7, wherein said drivingly connecting means includes a fluid clutch having impositive driving elements.

10. The combination as defined in claim 5, and means wherein said lug injector bushing operates to eject said coil form from said mandrel after the predetermined number of lugs have been mounted thereon.

11. The combination as defined in claim 6, wherein said bending means includes a triangularly shaped member movable to a position adjacent to said coil form to cause an initial bending of the end of the lug inserted through the lug receiving hole of the coil form, and means mounting said bending means to rotate and move with said punch holder during the upward stroke thereof to complete the bending of the lug.

12. The combination as defined in claim 10, and wherein said indexing means includes an indexing head on said mandrel shaft having dogs thereon coacting with a movable stop bar operable in response to the upward stroke of said punch holder and means causing operation of said crankshaft driving and cycling means.

References Cited

UNITED STATES PATENTS

| | | | |
|---|---|---|---|
| 2,893,010 | 7/1959 | Stuhre | 29—34 |
| 3,200,481 | 8/1965 | Lenders | 29—203 |
| 3,266,695 | 8/1966 | Cervenka et al. | 227—96 |

THOMAS H. EAGER, *Primary Examiner.*